United States Patent [19]

Pechau et al.

[11] Patent Number: 4,494,427
[45] Date of Patent: Jan. 22, 1985

[54] ROTATING SHEAR FOR HIGH-SPEED WIRE-ROLLING LINE

[75] Inventors: Gerhard Pechau; Ewald Wyzgol; Rudi Jacob, all of Magdeburg, German Democratic Rep.

[73] Assignee: Veb Schwermaschinenbau-Kombinat "Ernst Thälmann" Magdeburg, Magdeburg, German Democratic Rep.

[21] Appl. No.: 453,120

[22] Filed: Dec. 27, 1982

[30] Foreign Application Priority Data

Dec. 31, 1981 [DE] Fed. Rep. of Germany ......... 236519

[51] Int. Cl.³ ............................................. B23D 25/12
[52] U.S. Cl. ...................................... 83/306; 83/322; 83/345
[58] Field of Search ................. 83/306, 307, 322, 345, 83/444

[56] References Cited

U.S. PATENT DOCUMENTS 4,392,399 7/1983 Wyzgol et al. ........................ 83/106
4,406,198 9/1983 Pechau et al. ........................ 83/170

FOREIGN PATENT DOCUMENTS

129127 12/1977 German Democratic Rep. ... 83/307
145237 12/1980 German Democratic Rep. ... 83/307

Primary Examiner—Frank T. Yost
Attorney, Agent, or Firm—Karl F. Ross; Herbert Dubno

[57] ABSTRACT

A rotating shear for cutting a rapidly moving wire has a pair of cutter heads rotatable about parallel axes and having respective blades. A drive synchronously counterrotates the heads about the respective axes with close juxtaposition of the blades on each revolution. Thus when the wire is between the heads level with the blades it is severed thereby. A guide tube surrounds the wire upstream of the heads and has a downstream end movable generally parallel to the axes and positioned adjacent and between the cutter heads. The wire exits from the guide tube in a direction generally perpendicular to the plane of the head axes. A guide head fixed to one of the cutter heads is formed with a generally helical guide groove centered on the respective axis. An axially and radially displaceable but angularly generally nondisplaceable follower can move between a position engaged in the groove and axially entrainable thereby and a position clear thereof. An actuator displaces the follower between the positions. A rigid link is connected between the follower and the guide tube so that when the follower is in the groove the tube can be pulled axially into and out of alignment with the blades for cropping of the wire and when out of the groove the tube can be moved independently of the head.

10 Claims, 4 Drawing Figures

FIG.1

ROTATING SHEAR FOR HIGH-SPEED WIRE-ROLLING LINE

FIELD OF THE INVENTION

The present invention relates to a shear for a high-speed wire-rolling line. More particularly this invention concerns a rotating shear used to crop the ends from a wire and to subdivide it longitudinally.

BACKGROUND OF THE INVENTION

A rolling line for wire incorporates rolling and water-type thermal treatment stages which reduce a billet to a wire, here intended to cover any very long workpiece of uniform cross-sectional size and shape, whose leading and trailing ends are of imperfect structure. Thus it is necessary to crop and recycle these ends. It is also necessary to longitudinally subdivide some very long wires for reeling or finish milling.

Since efficiency and the need to prevent blockages at the rolling stands require the use of high transport speeds—5000 to 10,000 feet/minute—for the wire while keeping it under substantial tension, the shear must be able to work on a rapidly moving and taut workpiece. Flying shears which move rapidly along with the workpiece have been used, but have been found extremely wasteful of space in the mill.

Accordingly resort has been had to drum-type or rotating shears having blades which rotate at a peripheral speed equal to the wire transport speed. These blades are provided on drums or heads rotatable about parallel superposed axes in such a manner that with each rotation the blades pass closely, normally with the upper blade ahead in the travel direction of the lower blade. The heads are formed with identical helical grooves that form a row of passages at the nip between the two rollers. Immediately downstream of the shear there is provided a so-called discharge unit having three horizontally spaced holes, for receiving the front end part, the rear end part, and the good center part.

As described in East German patent documents Nos. WP B 23, D/221 156 and WP B 23 D/221 154 the wire passes upstream of the shear through a horizontally swingable guide tube that pushes it at the right moment into the end of the nip between the two cutter heads so that the wire is then entrained by the mating helical grooves and is pulled across to the blades where it is cut. The trailing part of the wire then continues across as the heads rotate. This system can accurately crop the ends from the wire, but requires two separate shears, one to crop the leading end and one to crop the trailing end. In addition the guide tube can only swing back to the starting position once the wire has completely passed through, that is between billets, so the system is slow.

It has been suggested in East German patent document 145,237 to use a shear of the above-described general type, but where the heads can be swung apart so that the guide tube can be returned to its starting position between cuts. Such an arrangement can be made fairly compact, but is itself a very complex machine. The universal joints necessary for the head drive shafts are complex, as is the support mechanism necessary for holding the cutter heads together for shearing the workpiece. Making the system work with the proper synchronization for an accurate cut requires complex control equipment.

OBJECTS OF THE INVENTION

It is therefore an object of the present invention to provide an improved rotary shear for a high-speed wire-rolling installation.

Another object is the provision of such a rotary shear for a high-speed wire-rolling installation which overcomes the above-given disadvantages.

A further object is to provide a shear which can work on a rapidly moving workpiece and which can crop both ends of the wire accurately.

SUMMARY OF THE INVENTION

These objects are attained according to the instant invention in a rotating shear for cutting a rapidly moving wire which has a pair of cutter heads rotatable about parallel axes and having respective blades. Drive means synchronously rotates the heads about the respective axes with close juxtaposition of the blades on each revolution. Thus when the wire is between the heads level with the blades it is severed thereby. A guide tube surrounds the wire upstream of the heads and has a downstream end movable generally parallel to the axes and positioned adjacent and between the cutter heads. The wire exits from the guide tube in a direction generally perpendicular to the plane of the head axes. A guide head fixed to one of the cutter heads is formed with a generally helical guide groove centered on the respective axis. An axially and radially displaceable but angularly generally nondisplaceable follower can move between a position engaged in the groove and axially entrainable thereby and a position clear thereof. Actuator means displaces the follower between the positions. A rigid link is connected between the follower and the guide tube so that when the follower is in the groove the tube can be pulled axially into and out of alignment with the blades for cropping of the wire and when out of the groove the tube can be moved independently of the head.

The drive means according to this invention counter-rotates the cutting heads and same are formed with helical grooves of the same pitch and hand and each of a radial depth greater than the wire diameter. The guide groove is of the same pitch but opposite hand as the cutter-head grooves. In this case the shear has another guide head fixed on the other cutter head and formed with a generally helical guide groove centered on the respective axis and of the same pitch and hand as the other guide groove. The two guide heads are radially spaced sufficiently that the follower can be engaged in one of the guide grooves without engaging in the other.

In addition in this system the link extends axially from the tube and follower to the actuator means and has thereat an end displaceable parallel to the plane of the axes by the actuator. Thus the actuator can displace the end in one direction to urge the follower into the guide groove of the guide head of one cutter head while urging the wire into the cutter groove of the other cutter head and oppositely to urge the follower into the guide groove of the guide head of the other cutter head while urging the wire into the cutter groove of the one cutter head.

Furthermore one of the cutter heads and the respective guide head are formed at their juxtaposed axial ends with annular holding grooves. The other cutter head and the respective guide head are formed at their opposite ends with annular holding grooves. Such an arrangement works very smoothly, delivering the cut-off end pieces to one side and good central portion of the wire to the other.

According to another feature of this invention the blades are provided generally axially centrally in the cutter heads. In addition in this system also the drive means counterrotates the cutting heads and one of the cutter heads is formed flanking the respective blade with a pair of helical grooves of the same pitch and size as the guide groove and of opposite hand to each other. The guide groove here is tapered away from the respective cutter head. The shear of this system also has another guide head fixed on the other cutter head and formed with a generally helical guide groove centered on the respective axis, tapered away from the respective cutter head, and of the same pitch and hand as the other guide groove. The follower is alternately radially displaceable into the guide grooves and the cutter grooves are pitched relative to the respective axis such that when the follower is engaged in either of the guide grooves and the wire is engaged in the respective cutter groove, the wire cannot engage in the other cutter groove.

In addition according to this invention the shear has a guide defining a straight travel path for the follower and downstream guide-tube end and a pivot permitting the guide to pivot about an axis axially level with the blades and parallel to the travel direction of the wire. Such an arrangement is extremely simple and operates very smoothly. It can be produced at minimal cost and will, as mentioned above, deliver the scrap to one side and the good wire to the other.

According to another system the shear has another guide head fixed on the other cutter head and formed with a generally helical guide groove centered on the respective axis and of the same pitch and hand as the other guide groove. The two guide heads are radially spaced sufficient that the follower can be engaged in one of the guide grooves without engaging in the other. A guide defines for the downstream guide-tube end a straight travel path parallel to and between the axes of the cutter heads. In this system the guide heads have axially opposite ends formed with annular holding grooves.

It also possible according to this invention for the cutter heads to have two such pairs of blades offset axially from each other. The guide head has two such guide grooves offset similarly axially from each other. The guide head is formed at one end of each guide groove with a respective annular holding groove. This system further has a guide defining for the tube a travel path moving sinuously in the plane of the axes. In addition at least one of the cutter heads is formed with cutter grooves of the same pitch, shape, and hand as the guide grooves.

The actuator according to this invention is pivoted at one end on a fixed support and at the other end on the follower. This other end can also be pivoted on an axial projection of the link, or even on the guide.

DESCRIPTION OF THE DRAWING

The above and other features and advantages will become more readily apparent from the following, reference being made to the accompanying drawing in which.

SPECIFIC DESCRIPTION

Figure 1:
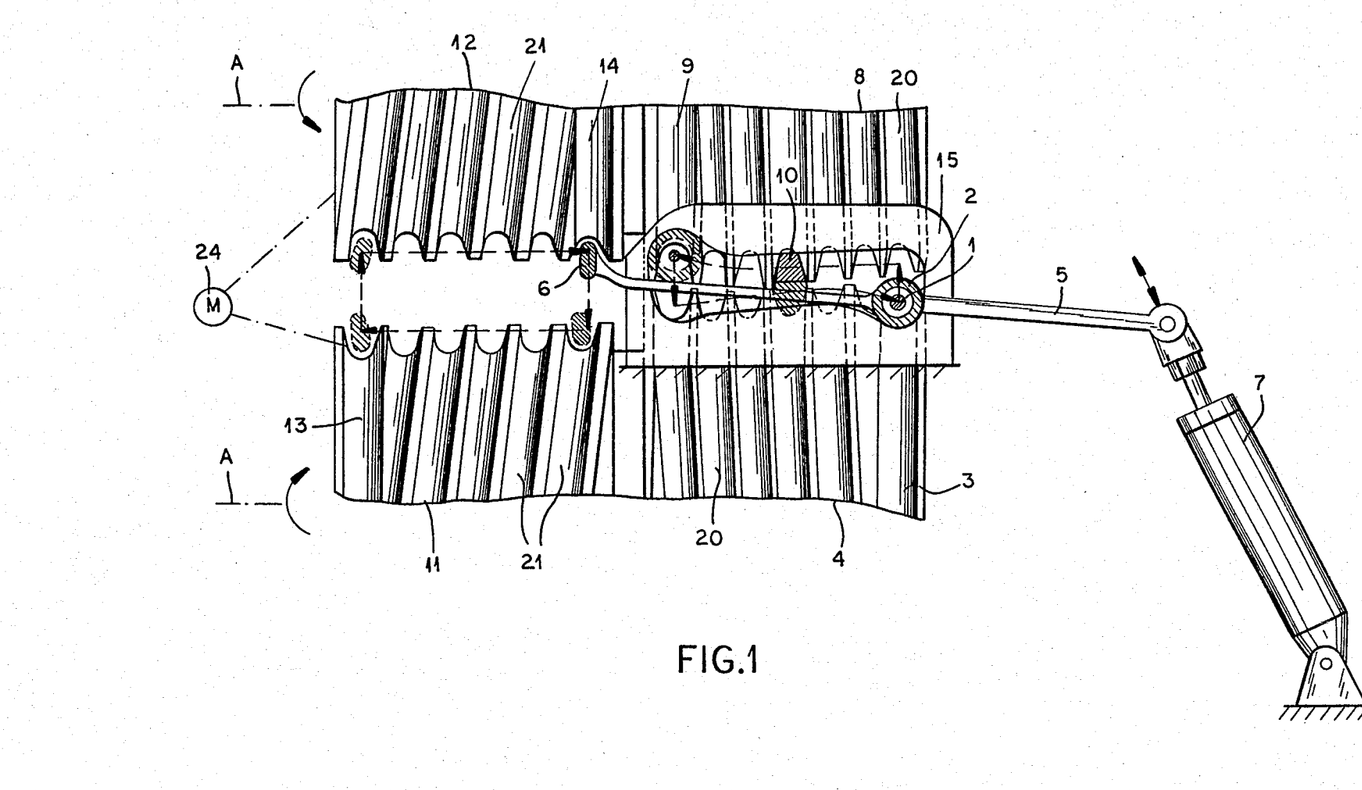
FIGS. 1, 2, 3, and 4 are partly schematic end views of four different systems according to the present invention all taken looking downstream.

As seen in FIG. 1 a shear basically has a lower cutter head 4 and an upper cutter head 8 rotated in opposite direction about respective parallel and vertically superposed axes A by a drive indicated schematically at 24. The two heads 4 and 8 are basically cylindrical and are normally only mounted at one end so they cannot move radially relative to each other. At their centers the heads 4 and 8 are provided with complementary blades 10 and the drive rotates these heads 4 and 8 synchronously so that the blades 10 approach each other very closely on each revolution, effectively severing anything between them.

Each of the rollers 4 and 8 is formed with a relatively deep helical guide groove 20, the two grooves together forming as seen in end view a series of axially spaced relatively tall passages or holes that seem to move axially, to the left in the drawing, as the motor 24 rotates the heads 4 and 8. The wire 1 is guided immediately to one side of the shear in a tube 2 whose illustrated downstream end can move axially. The wire 1 is of such a size that when engaged in the groove 20 of the one head 4 it does not engage in the groove 20 of the other. In addition the extreme left-hand end of the lower head 4 is formed with an annular groove into which the respective groove 20 empties, and which is aligned with the scrap passage of a discharge unit such as described in our copending and jointly filed application.

Ser. No. 453,118 to which reference should be made for more details. Similarly the opposite end of the upper head 8 is formed with an annular endless groove 9 into which the respective groove 20 empties, and which is aligned with the good-piece passage of the discharge unit. The holding grooves 3 and 9 are somewhat deeper radially than the grooves 20, but all the grooves are sufficiently deep that if the wire 1 is engaged fully in them it will not engage radially at all in the facing groove.

Immediately upstream of the two heads 4 and 8 is a guide 15 forming an opening that extends parallel to the axes A but that is higher at locations aligned with the holding grooves 3 and 9 than therebetween. This guide is formed by a vertical plate that is fixed relative to the axes A. The tube 2 is held in this guide 15 and is constrained thereby to move only within the confines of the grooves 3, 9, and 20.

Fixed on each cutter head 4 and 8 is a respective coaxial and cylindrical guide head 11 and 12 of substantially smaller diameter. In addition these heads 11 and 12 are formed with respective identical helical grooves 21 which are of the same pitch but opposite hand as the grooves 20. The lower groove 21 terminates at its left-hand end in an annular holding groove 13 into which it empties and the upper groove 21 at its right-hand end in an annular holding groove 14 into which it also empties.

The tube 2 is fixed in the middle of a long straight and rigid arm whose one end is formed with a guide element or follower 6 engageable in either of the grooves 21 and whose other end is pivoted on the piston rod of an actuator 7, here a hydraulic ram whose cylinder is pivoted at a fixed location. This actuator 7 is operated by the controller of the entire rolling line.

The above-described system functions as follows:

To start with the system is in the position of FIG. 1, that is with the cylinder 7 contracted so the wire 1 is seated in the groove 3 and the follower 6 in the groove 14. Even though the heads 4 and 11 are rotating jointly oppositely to the heads 8 and 12, there will be no axial movement of the workpiece 1.

When the location at which the wire 1 is to be cut is upstream of the vertical plane of the cutter axes A by a distance equal to the rectified length of the groove 21 of the head 8 to the right of the respective blade 10, the cylinder 7 is expanded. This action swings the follower down as shown by the dashed-line arrow into the extreme right-hand end of the groove 21 of the lower guide head 11, using the arm 5 as a first-class lever with the wire 1 forming the fulcrum. Virtually simultaneously the guide tube 2 is levered up into the right-hand end of the groove 20. Since the hands of these grooves 20 and 21 are opposite and they are rotated oppositely, the net effect is to force the wire 1 to the left, toward the blades 10, with the lateral deflecting force being partly exerted by the head 8 directly on the wire 1 and partly by the head 11 on the follower 6, force being transmitted between them by the rigid link constituted by the arm 5.

When the wire 1 comes to the center it will be cut through by the blades 10 and will continue to move to the left. The cropped-off end piece will move off into the scrap passage aligned with the groove 3 and the following piece will move off to the left to enter a good-piece passage aligned with the groove 9.

With the cylinder 7 still expanded the wire 1 will stop moving laterally when it is in the holding groove 9 and the follower 6 is in the holding groove 13. In this position the entire system can continue to run for the entire length of the good center piece of the wire.

When the location at which the cut for removing the bad trailing end of the wire is upstream of the plane of the axes A by a distance equal to the rectified length of the groove 20 of the head 4 to the left of the blades 10, the cylinder 7 is contracted. This action generally simultaneously levers the follower 6 up out of the holding groove 13 into the end of the overlying groove 21 while simultaneously moving the wire 1 down out of the holding groove 9 into the left-hand end of the groove 20 of the head 4. The wire 1 is therefore moved axially to the right, since the grooves 20 and 21 are of opposite hand and the heads 4 and 12 are rotated oppositely.

When the wire 1 comes to the center again it is cut through and continues to move to the right. The end of the good piece of wire continues to feed into the passage aligned with the groove 9 while the trailing end is moved off to the right and fed into the scrap passage aligned with the holding groove 3.

As a result both the leading and trailing ends of the same piece of wire can be cropped off by the same shear, and both pieces will be fed into the same scrap passage. This makes for a considerable saving in the manufacture cost for the shear while also simplifying the structure of the discharge unit immediately downstream of it.

Figure 2:
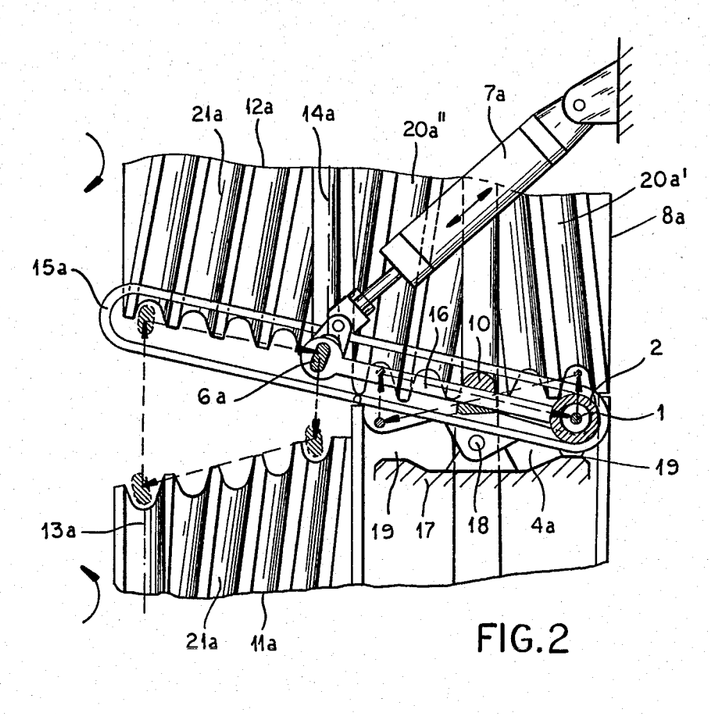

In the arrangement of FIG. 2 the guide 15a defines a straight travel path for the downstream end of the tube 2, but is mounted at 18 on a support 17 axially slightly upstream of the heads 4a and 8a for pivoting about an axis parallel to the workpiece travel direction and underneath the blades 10. In angular end positions of the guide 15a it abuts at locations or stops 19 on the support 17. Here the lower head 4a is formed with an ungrooved smooth surface with a slight central crown whereas the upper head 3a is formed with a pair of cutter grooves 20a' and 20a" axially flanking the respective blade 10 and of identical shape, but opposite hand to each other. The drive rotates the head 8a in such a direction that if the wire is engaged in either of the grooves 20a' or 20a" it will be urged thereby toward the blades 10.

The cutter heads 4a and 8a carry respective frustoconical guide heads 11a and 12a formed with respective frustonically helical guide grooves 21' of the same pitch and hand as the groove 20a" and respectively terminating at their extreme left- and right-hand ends in respective holding grooves 13a and 14a as in FIG. 1.

The actuator 7a in this case is pivoted on a fixed support at one end and on the other end is pivoted on the follower 6a which is itself connected by a rigid link 16 to the downstream end of the tube 2. The actuator 17 could equally well be pivoted on the guide 15a, since the follower 6a also runs in this guide 15a.

This FIG. 2 system works as follows:

To start with everything is in the position of FIG. 2, with the guide pivoted up so its right-hand end bears on the right-hand abutment 19, the wire 1 is disengaged from any grooves, and the follower 6a is engaged in the holding groove 14a. In this position the bad leading end is fed through the shear into the scrap port of the discharge unit.

To crop off this leading end the cylinder 7a is expanded, thereby forcing the follower into the inner end of the groove 21a of the head 11a while forcing the wire into the groove. The wire 3 and follower 6a move synchronously to the left in the respective grooves 20a' and 21a until the wire comes between the blades 10 which cut it through, so that the leading-end piece moves out into the scrap passage aligned with the inner end of the heads 4a and 8a.

Once it is cut the wire 1 is pulled by the tube 2 out of engagement with the head 8a, since the grooves 20a' and 20a" are slightly frustoconical, rising toward the middle. Thus as the follower continues to track in the groove 21a of the head 11a it pulls the wire all the way to the opposite outer end of the heads 4a and 8a. In this end position the mechanism stops until the trailing end needs to be cut off the wire.

To crop the trailing end the cylinder 7a is contracted, moving the follower 6a up as indicated by the dashed-line arrow until the guide 15a comes to bear again on the inner or right-hand abutment 19 and pushing the wire into the left-hand end of the groove 20a". Rotation of the heads 4a and 12 will therefore displace the wire 1 toward the right, cutting it with the blades 10 and then pulling the following bad end piece out of engagement with the head 8a and across to deposit it in the scrap passage aligned with the right-hand ends of the heads 4a and 8a.

Thus this system also can cut the leading and trailing ends from a piece of wire, while depositing both scrap pieces in the same location. Obviously the equipment necessary for doing so is relatively simple so that the cutting location can be exactly positioned.

Figure 3:
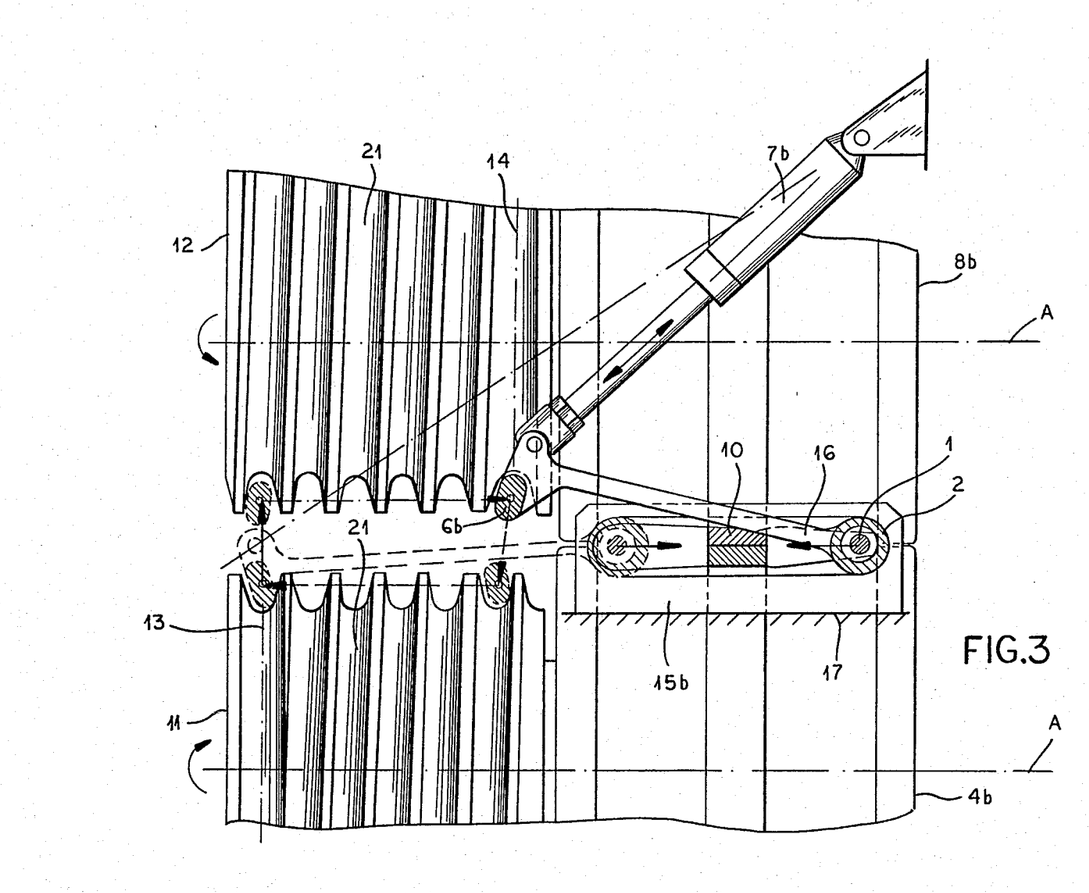

The arrangement of FIG. 3 has cutter heads 4b and 8b that are ungrooved, merely being cylindrical and formed at their centers with the cutter blades or teeth 10. The guide heads 11 and 12 are identical to those of FIG. 1.

Here the guide 15 is stationary and defines for the tube 1 a straight travel path parallel to the axes A. As in FIG. 2 the actuator 7a is pivoted at the follower 6b which is connected to the downstream end of the tube 2 by a rigid link 16.

This system functions the same as that of FIG. 1, with the follower 6b being moved up and down to follow the parallelogrammatic path indicated by the dashed-line arrows. First the actuator 7b is extended to move the follower down into the groove 21 of the lower guide head 11, cut off the leading end, and then come to a stop in the holding groove 13, then the actuator 7b is contracted to move the follower up into the groove 21 of the upper guide head 12, cut off the trailing end, and then come to a stop in the holding groove 14.

This system is quite simple, nonetheless the force exerted through the link 16 on the tube 2 is easily sufficient to laterally displace even a very taut wire 1, yet switchover from travel in one direction to travel in the other is simple and exact.

Figure 4:
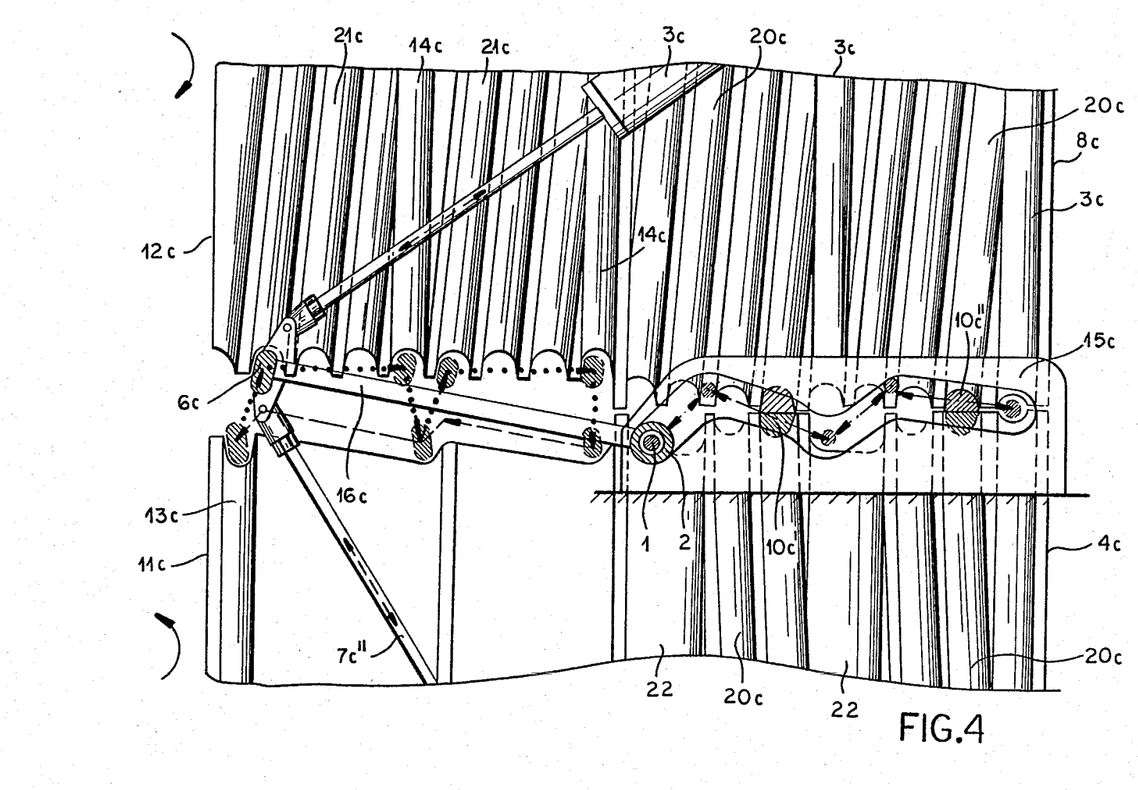

FIG. 4 shows a system having a lower cutter head 4c formed with a pair of identical grooves 20c terminating at their left-hand ends in holding grooves 22 having an axial dimension equal to twice the pitch of these grooves 20c. An upper cutter head 8c that is counterrotated to the head 4c is formed with two helical grooves 20c also that end at their right-hand ends in single-width holding grooves 3c. The grooves 20c are all of the same hand and pitch and are closely spaced between the holding grooves 22 that the wire 1 engaged between them will be entrained by both of them. Immediately to the left of each groove 3c the heads 4c and 8c are provided with blade pairs 10c' and 10c''.

A stationary guide 15c here defines a generally S-shaped travel path that dips at the left-hand end of each holding groove 22 and that otherwise follows the line of the holes defined by the screwthreads 20c. The guide tube 2 rides in this and is connected via a rigid link 16c to the follower 6c which is connected to an upper cylinder 7c' and a lower cylinder 7c''.

The lower guide had 11c is formed with no effective grooves except a left-hand holding groove 13c. The upper head 12c is formed with two helical guide grooves 21c and annular holding grooves 14c identical to the grooves 20c and 3c, respectively.

This FIG. 4 arrangement functions as follows:

To start with the cylinder 7c' is fully expanded to hold the guide 6c in the holding groove 13c, during which time the bad leading end of the wire 1 passes from the tube 2 through the shear at the left-hand holding groove 22.

The cylinder 7c' then contracts to lift the follower 6c into the left-hand end of the left-hand guide groove 21c, which action forces the follower 6c and the tube 2 toward the right. This brings the tube 2 into the left-hand helical groove 20c of the upper cutter head 8c so that the entire follower, link, tube subassembly moves toward the right. The wire 1 comes between the left-hand jaws 10c' and is cut through. Subsequently the follower 6c comes into the left-hand holding groove 14c and the guide 15c forces the tube down so the wire enters the left-hand end of the right-hand holding groove 22. In this position the good portion of the wire passes through the still rotating shear for as long as necessary.

To crop off the rear end the lower actuating cylinder 7c'' is contracted to pull the follower 6c out of the left-hand holding groove 14c, and immediately thereafter the upper cylinder 7c' is contracted as the cylinder 7c'' is relaxed to pull the follower 6c back up into the left-hand end of the right-hand guide groove 21c. The above-described procedure repeats itself, with the wire 1 being cut through at the right-hand blades 10c'' and coming to rest in the right-hand holding groove 3c while the follower 6c comes to rest similarly in the right-hand holding groove 14c. Thus for cropping leading and trailing ends from the wire the follower is displaced along the path indicated by the dotted line in FIG. 4.

Once the run is over and there is no longer any wire in the tube 2 the upper actuator 7c' is extended while the lower cylinder 7c'' is relaxed to push the follower down and along the stepped surface of the lower guide roller 6c as indicated in dashed lines. Cropping on this reverse stroke would be possible if the lower guide head 11c were grooved like the upper one 12c, but of course with the holding grooves appropriately reversed.

This system cannot conveniently be used for longitudinally subdividing the wire, and requires the use of a three-passage discharge unit. Nonetheless it functions very smoothly and can cut very accurately.

We claim:

1. A rotating shear for cutting a rapidly moving wire, the shear comprising:

a pair of cutter heads rotatable about parallel axes and having respective blades;

means for synchronously rotating the heads about the respective axes with close juxtaposition of the blades on each revolution, whereby when the wire is between the heads level with the blades it is severed thereby;

a guide tube surrounding the wire upstream of the heads and having a downstream end movable generally parallel to the axes and positioned adjacent and between the cutter heads, the wire exiting from the guide tube in a direction generally perpendicular to the plane of the head axes;

a guide head fixed to one of the cutter heads and formed with a generally helical guide groove centered on the respective axis;

an axially and radially displaceable but angularly generally nondisplaceable follower movable between a position engaged in the groove and axially entrainable thereby and a position clear thereof;

actuator means for displacing the follower between the positions;

a rigid link connected between the follower and the guide tube, whereby when the follower is in the groove the tube can be pulled axially into and out of alignment with the blades for cropping of the wire and when out of the groove the tube can be moved independently of the head, the drive means counterrotating the cutting heads, said cutting heads being formed with helical grooves of the same pitch and hand and each of a radial depth greater than the wire diameter, the guide groove being of the same pitch but opposite hand as the cutter-head grooves; and another guide head fixed on the other cutter head and formed with a generally helical guide groove centered on the respective axis and of the same pitch and hand as the other guide groove, the two guide heads being radially spaced sufficiently that the follower can be engaged in one of the guide grooves without engaging in the other.

2. The rotating wire shear defined in claim 1 wherein the link extends axially from the tube and follower to the actuator means and has thereat an end displaceable parallel to the plane of the axes by the actuator, whereby the actuator can displace the end in one direction to urge the follower into the guide groove of the guide head of one cutter head while urging the wire into the cutter groove of the other cutter head and oppositely to urge the follower into the guide groove of the guide head of the other cutter head while urging the wire into the cutter groove of the one cutter head.

3. The rotating wire shear defined in claim 2 wherein one of the cutter heads and the respective guide head are formed at their juxtaposed axial ends with annular holding grooves, the other cutter head and the respective guide head being formed at their opposite ends with annular holding grooves.

4. The rotating wire shear defined in claim 1 wherein the blades are provided generally axially centrally in the cutter heads.

5. A rotating shear for cutting a rapidly moving wire, the shear comprising:

a pair of cutter heads rotatable about parallel axes and having respective blades;

means for synchronously rotating the heads about the respective axes with close juxtaposition of the blades on each revolution, whereby when the wire is between the heads level with the blades it is severed thereby;

a guide tube surrounding the wire upstream of the heads and having a downstream end movable generally parallel to the axes and positioned adjacent and between the cutter heads, the wire exiting from the guide tube in a direction generally perpendicular to the plane of the head axes;

a guide head fixed to one of the cutter heads and formed with a generally helical guide groove centered on the respective axis;

an axially and radially displaceable but angularly generally nondisplaceable follower movable between a position engaged in the groove and axially entrainable thereby and a position clear thereof;

actuator means for displacing the follower between the positions;

a rigid link connected between the follower and the guide tube, whereby when the follower is in the groove the tube can be pulled axially into and out of alignment with the blade for cropping of the wire and when out of the groove the tube can be moved independently of the head, the blades being provided generally axially centrally in the cutter heads, the drive means counterrotating the cutting heads, one of the cutter heads being formed flanking the respective blade with a pair of helical grooves of the same pitch and size as the guide groove and of opposite hand to each other, the guide groove being tapered away from the respective cutter head; and another guide head fixed on the other cutter head and formed with a generally helical guide groove centered on the respective axis, tapered away from the respective cutter head, and of the same pitch and hand as the other guide groove, the follower being alternately radially displaceable into the guide grooves, the cutter grooves being pitched relative to the respective axis such that when the follower is engaged in either of the guide grooves and the wire is engaged in the respective cutter groove, the wire cannot engage in the other cutter groove.

6. The rotating wire shear defined in claim 5, further comprising a guide defining a straight travel path for the follower and downstream guide-tube end; and a pivot permitting the guide to pivot about an axis axially level with the blades and parallel to the travel direction of the wire.

7. A rotating shear for cutting a rapidly moving wire, the shear comprising:

a pair of cutter heads rotatable about parallel axes and having respective blades;

means for synchronously rotating the heads about the respective axes with close juxtaposition of the blades on each revolution, whereby when the wire is between the heads level with the blades it is severed thereby;

a guide tube surrounding the wire upstream of the heads and having a downstream end movable generally parallel to the axes and positioned adjacent and between the cutter heads, the wire exiting from the guide tube in a direction generally perpendicular to the plane of the head axes;

a guide head fixed to one of the cutter heads and formed with a generally helical guide groove centered on the respective axis;

an axially and radially displaceable but angularly generally nondisplaceable follower movable between a position engaged in the groove and axially entrainable thereby and a position clear thereof;

actuator means for displacing the follower between the positions;

a rigid link connected between the follower and the guide tube, whereby when the follower is in the groove the tube can be pulled axially into and out of alignment with the blades for cropping of the wire and when out of the groove the tube can be moved independently of the head, the drive means counterrotating the cutting heads;

another guide head fixed on the other cutter head and formed with a generally helical guide groove centered on the respective axis and of the same pitch and hand as the other guide groove, the two guide heads being radially spaced sufficiently that the follower can be engaged in one of the guide grooves without engaging in the other; and a guide defining for the downstream guide-tube end a straight travel path parallel to and between the axes of the cutter heads.

8. The rotating wire shear defined in claim 7 wherein the guide heads have axially opposite ends formed with annular holding grooves.

9. A rotating shear for cutting a rapidly moving wire, the shear comprising:

a pair of cutter heads rotatable about parallel axes and having respective blades;

means for synchronously rotating the heads about the respective axes with close juxtaposition of the blades on each revolution, whereby when the wire is between the heads level with the blades it is severed thereby;

a guide tube surrounding the wire upstream of the heads and having a downstream end movable generally parallel to the axes and positioned adjacent and between the cutter heads, the wire exiting from the guide tube in a direction generally perpendicular to the plane of the head axes;

a guide head fixed to one of the cutter heads and formed with a generally helical guide groove centered on the respective axis;

an axially and radially displaceable but angularly generally nondisplaceable follower movable between a position engaged in the groove and axially entrainable thereby and a position clear thereof;

actuator means for displacing the follower between the position;

a rigid link connected between the follower and the guide tube, whereby when the follower is in the groove the tube can be pulled axially into and out of alignment with the blades for cropping of the wire and when out of the groove the tube can be moved independently of the head, the cutter heads having two such pairs of blades offset axially from each other, the guide head having two such guide grooves offset similarly axially from each other, the guide head being formed at one end of each guide groove with a respective annular holding groove; and a guide defining for the tube a travel path moving sinuously in the plane of the axes.

10. The rotating wire shear defined in claim 9 wherein at least one of the cutter heads is formed with cutter grooves of the same pitch, shape, and hand as the guide grooves.

* * * * *